June 20, 1939.      F. G. THWAITS      2,163,387
VEHICULAR TANK
Filed Nov. 16, 1936      3 Sheets-Sheet 2
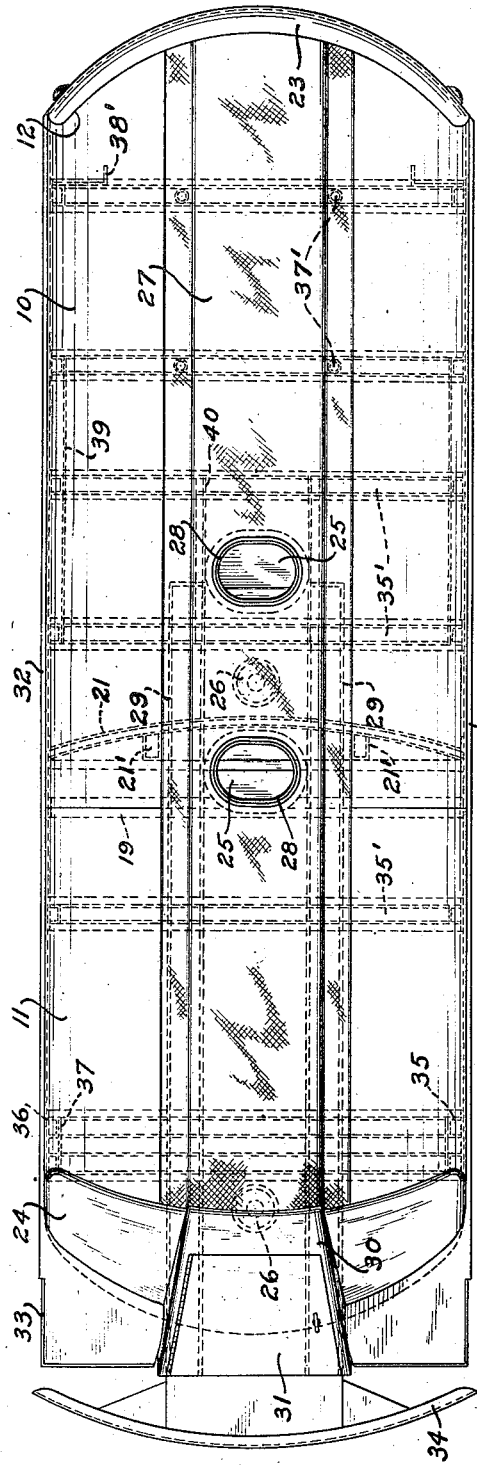
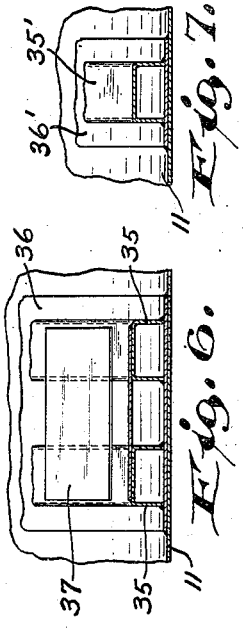
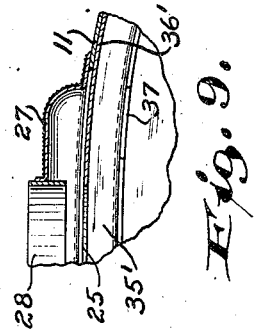
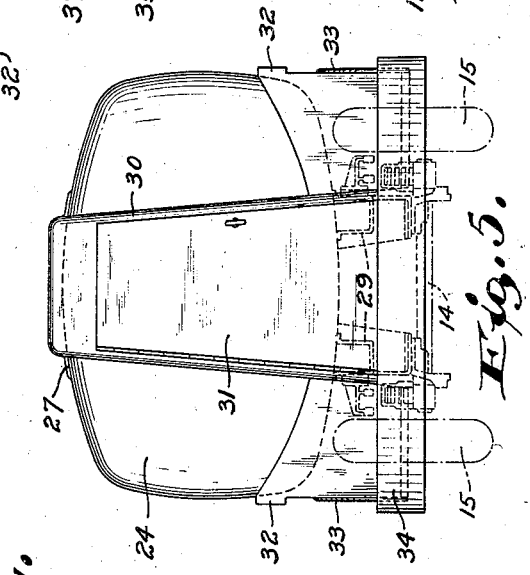
INVENTOR.
F. G. Thwaits
BY Morsell, Lieber & Morsell
ATTORNEYS.

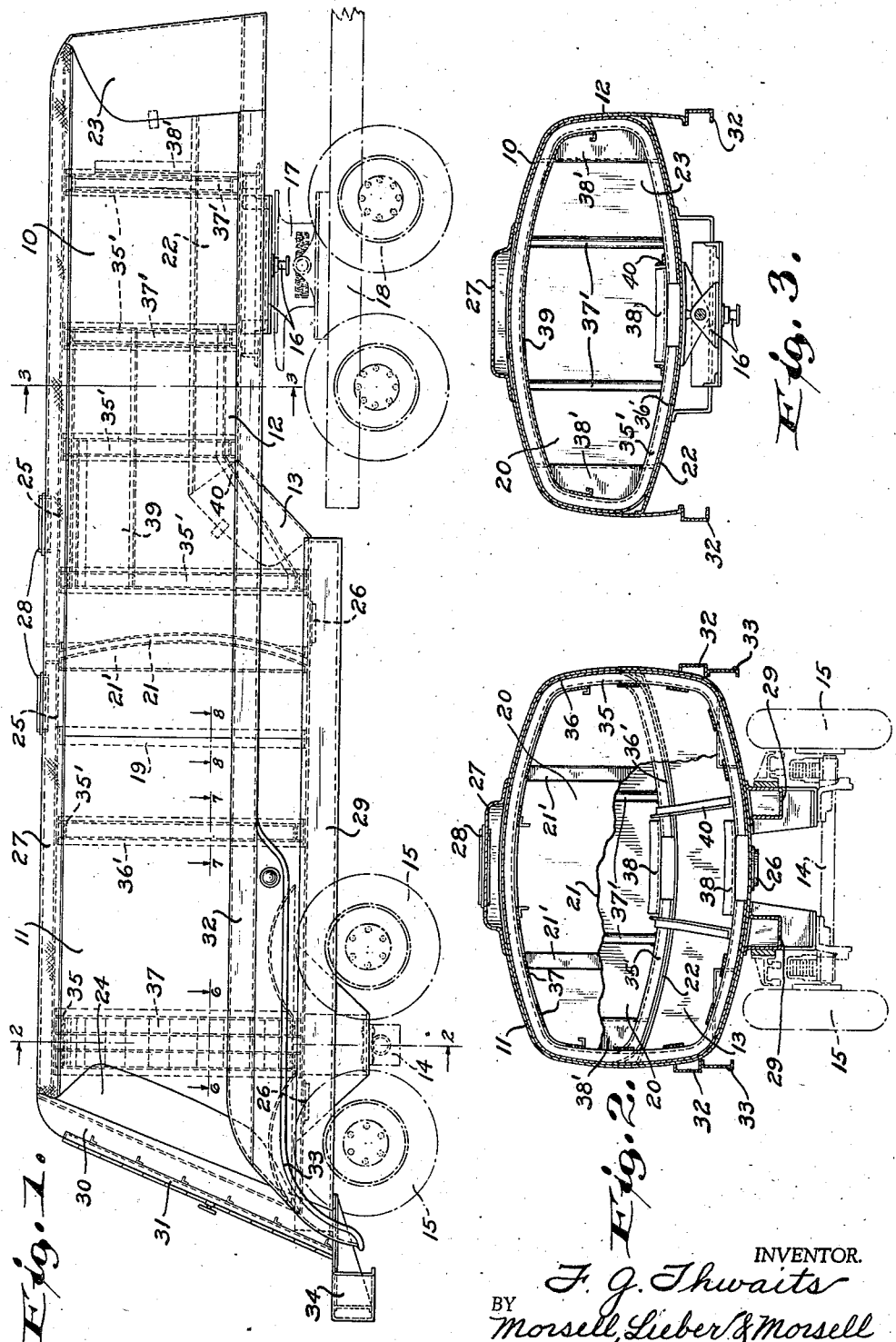

June 20, 1939.  F. G. THWAITS  2,163,387
VEHICULAR TANK
Filed Nov. 16, 1936   3 Sheets-Sheet 3
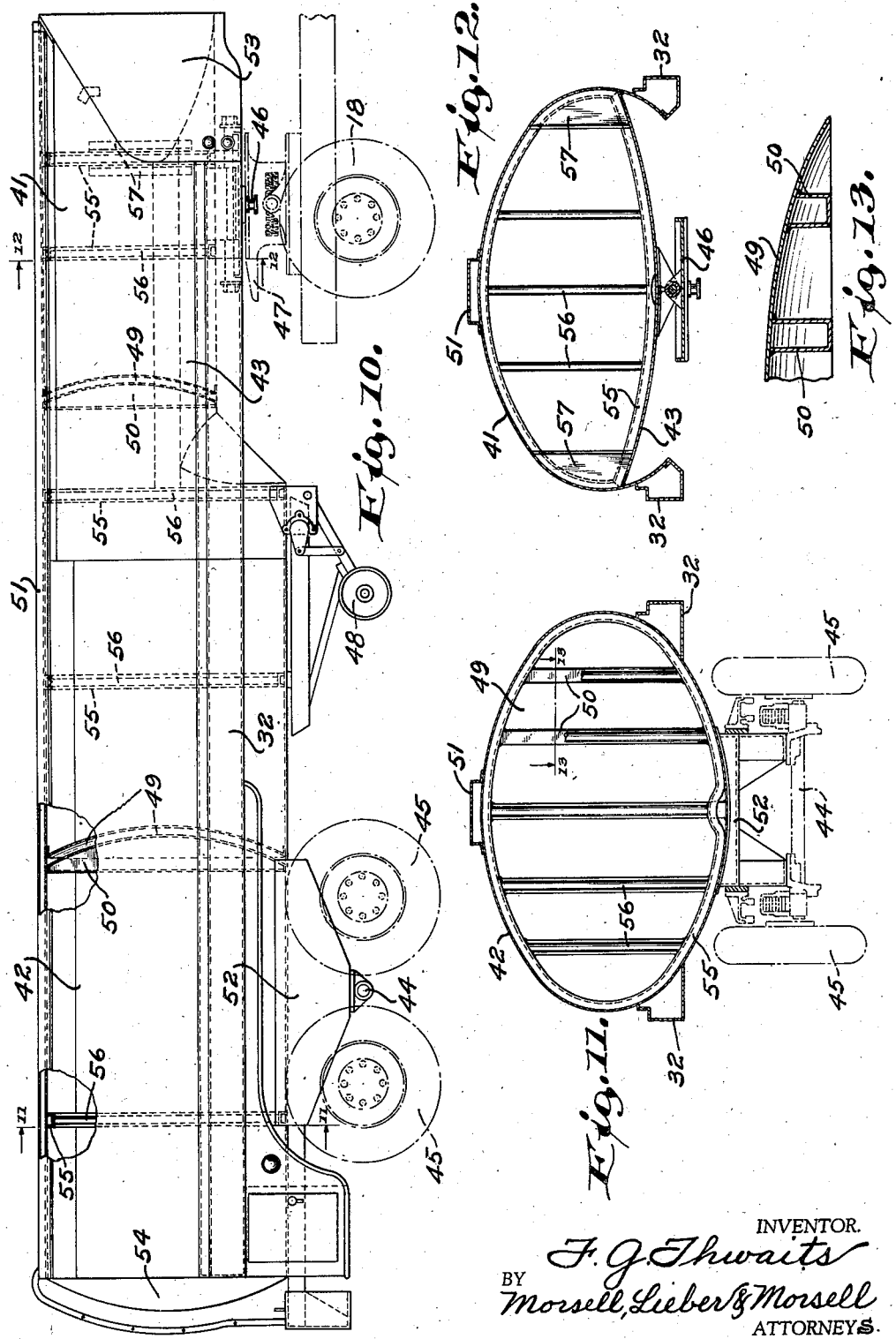
INVENTOR.
F. G. Thwaits
BY Morsell, Lieber & Morsell
ATTORNEYS.

Patented June 20, 1939

2,163,387

UNITED STATES PATENT OFFICE 2,163,387

VEHICULAR TANK

Frederick G. Thwaits, Wauwatosa, Wis., assignor to The Heil Co., Milwaukee, Wis., a corporation of Wisconsin Application November 16, 1936, Serial No. 111,039

5 Claims. (Cl. 220—71)

My present invention relates in general to various improvements in the art of confining and of transporting fluids from place to place, and relates more specifically to improvements in the construction of vehicular liquid storage tanks especially adapted to be transported along highways and ordinary roads.

A general object of my present invention, is the provision of an improved vehicular tank which is simple and compact in construction, and which has maximum liquid confining capacity.

In the art of transporting liquids in bulk over the open highways, it has heretofore been customary to utilize so-called semi-trailer tanks, each comprising a shell usually having one or more partitions therein dividing the same into segregated liquid confining compartments, a carriage or frame upon which the shell is supported, rear wheels permanently associated with the carrier frame, and a fifth wheel member carried by the front end of the frame and adapted for detachable cooperation with the rear end of a traction vehicle or propelling truck. It is desirable to maintain the center of gravity of such a vehicular tank when loaded, as low as possible, and the prior supporting carriages were therefore objectionable since they necessitated material limitation in tank capacity in order to retain the centers of gravity sufficiently close to the ground level. While attempts have been made to eliminate the under carriages by reenforcing the tanks themselves sufficiently to sustain the beam loads, the prior reenforced tanks have either been extremely complicated and hence difficult and costly to produce, or they were too heavy and did not effectively resist the beam loads during commercial use of the assemblages.

The present invention therefore contemplates provision of an improved frameless tank assemblage especially applicable to semi-trailers and having maximum capacity, low center of gravity, and adapted to effectively resist beam loads and other stresses to which the assemblage may be subjected during normal use.

Another object of the present invention is to provide a new and useful portable tank structure which can be readily constructed and assembled, and which is exceptionally durable and capable of resisting deflection or distortion both when loaded or empty.

A further specific object of the invention is the provision of a simple but effective internal reenforcement for a tank, and especially for a tank having portions of different cross-sectional area at the front and rear ends thereof.

Still another specific object of the invention is to provide reenforcing structure for the interior of a tank or similar container, which can be utilized to effectively reenforce tanks of different sizes and shapes.

An additional specific object of the invention is the provision of an improved vehicular tank which is devoid of external projections of the type tending to resist normal transportation of the vehicle at high speed.

These and other objects of my present invention will be apparent from the following detailed description.

A clear conception of embodiments of the several features constituting my present improvement and of the construction of vehicular tanks built in accordance with the invention, may be had by referring to the drawings accompanying and forming a part of this specification wherein like reference characters designate the same or similar parts in the various views.

Fig. 1 is a side elevation of an improved two-compartment semi-trailer tank having substantially rectangular transverse cross-section, showing the rear supporting carriage thereof in dot-and-dash lines, and also showing the rear end of the tank propelling vehicle in dot-and-dash lines;

Fig. 2 is a transverse vertical section through the rear end of the tank of Fig. 1, taken along the line 2—2 and also showing the rear supporting carriage in dot-and-dash lines;

Fig. 3 is a transverse vertical section through the front end of the tank, taken along the line 3—3 of Fig. 1;

Fig. 4 is a top view of the improved semi-trailer tank;

Fig. 5 is a rear view of the tank assemblage, also showing the rear supporting carriage in dot-and-dash lines;

Fig. 6 is an enlarged fragmentary horizontal section taken through the tank reenforcement along the line 6—6 of Fig. 1;

Fig. 7 is a similarly enlarged horizontal section taken through the tank reenforcement along the line 7—7 of Fig. 1;

Fig. 8 is another fragmentary horizontal section taken through the tank wall along the line 8—8 of Fig. 1;

Fig. 9 is an enlarged fragmentary transverse vertical section taken through the upper portion of the tank at one of the manholes;

Fig. 10 is a part sectional side elevation of another type of improved three-compartment semi-trailer tank having elliptical transverse cross-section, likewise showing the rear tank supporting carriage and the rear end of the propelling vehicle in dot-and-dash lines;

Fig. 11 is a transverse vertical section through the rear end of the tank of Fig. 10, taken along the line 11—11 and also showing the rear carriage in dot-and-dash lines;

Fig. 12 is a transverse vertical section through the front end of the tank of Fig. 10, taken along the line 12—12; and Fig. 13 is an enlarged fragmentary section taken horizontally through one of the partitions.

While the invention has been embodied in several specific types of semi-trailer tank vehicles having partitions dividing the same into compartments, it is not the intent to unnecessarily restrict the scope by virtue of such specific embodiment, since some of the novel features may be more generally applicable to other types of containers.

Referring to Figs. 1 to 9 inclusive of the drawings, the improved vehicular tank assemblage shown therein comprises in general front and rear longitudinally alined main outer shells 10, 11 each composed of one or more plates and having substantially rectangular transverse cross-section, the tank being provided with a forward portion 12 of reduced height connected to the rear portion by an offset 13; a rear truck or carriage 14 of relatively standard construction having springs and wheels 15 for supporting the rear end of the tank; and a fifth wheel member 16 secured to the underside of the reduced portion 12, the member 16 being detachably cooperable with another fifth wheel member 17 mounted upon the rear end of a propelling vehicle or tractor 18.

The tank shells 10, 11 are preferably formed of one or more sheets of relatively light sheet metal, and the rear sheet of the front shell 10 may be rigidly attached to the front sheet of the rear shell 11 by means of an internal connecting plate 19 which overlaps the shell ends and is welded thereto as shown in Fig. 8, to thereby provide a smooth external surface at the joint. In shorter tanks, only a single shell sheet may be used, and in longer tanks more than two alined sections or parts may be utilized to form the shell body; and the interior of the tank may be divided into segregated liquid confining compartments 20, by means of one or more transverse double dished partitions 21 welded or otherwise firmly attached within the main shells. These partitions 21 are preferably formed of dished plates separated from each other by a slight space which may be provided with a drain for detecting leakage past either of the partition plates, and the partitions 21 are preferably reenforced with vertical channels 21' rigidly attached to the dished side thereof as shown in Figs. 1, 2 and 4. The bottom of the reduced portion 12 may be enclosed by means of a curved lower plate 22 and the foremost end of the front shell 10 is sealed by a laterally curved front end head 23, while the rearmost end of the rear shell 11 is likewise tightly enclosed by a laterally curved rear end head 24; and each of the compartments 20 is provided with an upper manhole 25 and with a lower outlet or dispensing opening 26. It is to be noted that the offset 13 and the heads 23, 24 are curved only in a direction transversely of the tank, thereby facilitating manufacture by permitting these plates to be rolled into shape, and the curved transverse plates forming these elements may likewise be finally welded in place.

The improved reenforcements for strengthening the tank so as to resist distortion of all kinds, and for enabling the tank assemblage to effectively sustain beam loads, are of a varied nature and are also preferably formed of sheet metal and of standard structural plates and bars, being welded in place in the final assemblage. Extending throughout the lengths of the shells 10, 11 and rigidly attached to the upper outer portions thereof, is an external inverted U-shaped beam element 27 of relatively low height but of considerable width, this element 27 providing a cat walk along the top of the tank and having reenforcing thimbles 28 for receiving the closure covers secured thereto at the manholes 25 as shown in Fig. 9. The beam element 27 provides a longitudinal box section beam for reenforcing the top of the tank, and the bottom of the enlarged rear portion of the tank is provided with one or more external box beams 29 extending from the offset 13 to the extreme end of the lower portion of the shell 11. The external reenforcing beams 29 are rigidly welded or otherwise attached to the lower exterior portions of the shells 10, 11 and have their front ends enclosed; and the rear open ends of these beams are normally exposed to the interior of a rear compartment formed by an end reenforcing and protecting casing 30 having a door 31 for permitting insertion of a dispensing hose or the like within the beams 29 and for also permitting access to the rear tool storage compartment formed by the casing 30. The supporting carriage 14 may be firmly attached directly to the beams 29 as shown in Fig. 2, and the auxiliary supporting carriage ordinarily used when the tractor is withdrawn, may be likewise attached; and the beams 29 may either be spaced apart to clear the intervening dispensing openings 26, or they may be merged into a single beam. The opposite sides of the shells 10, 11 are moreover provided with longitudinal external side reenforcements 32 of channel-section extending throughout the tank length, and forming side aprons at the reduced forward portion 12 of the tank for concealing and protecting the fifth wheel member 16. The rear ends of the side reenforcements 32 merge into the rear fenders 33, and a bumper 34 may be attached to the beams 29 between the fenders 33 and beneath the rear casing 30.

The tank is thus effectively externally reenforced and stiffened by means of the elongated longitudinally extending external beam element 27, beams 29, casing 30, and reenforcements 32; and the interiors of the shells 10, 11 are additionally strengthened and reenforced locally wherever necessary or desirable. Adjacent the rear carriage 14, the interior of the rear shell 11 is provided with two laterally spaced channel beams 35 which may be rigidly attached to a retainer plate 36 which snugly fits and is firmly attached to the inner surface of the shell 11, and the portions of the beams 35 nearest the tank axis, may be rigidly interconnected by spaced parallel plates 37 as clearly shown in Fig. 6. This assemblage provides a transverse double box-section beam unit which may be assembled outside, and subsequently inserted and attached within the previously formed shell 11; and the lower ends of each beam 35 may be connected by means of a plate 38 which is spaced from the bottom of the tank shell sufficiently to avoid obstruction to drainage of the liquid. One or more similar annular beam units comprising a single beam 35', a connector plate 36, and a shorter retainer plate 36', as shown in Fig. 7, may also be applied to other local portions of the interior of the shells 10, 11 wherever necessary or desirable, and these single beams 35' may be reenforced by means of vertical tubular struts 37' and plates 38' as clearly shown in Figs. 2, 3 and 4. The offset portion of the front shell 10 and the zone of the fifth wheel, are preferably reenforced by means of a series of these annular transverse beam units fitted and secured within the shell, and these may be rigidly connected by means of an extended top plate 39 and lower angle beams 40 as illustrated in Figs. 1, 2 and 3. The reenforcing plate 39 is not essential, but as shown, this plate extends from one side of the tank to the other along the upper interior, and may also extend entirely along and forwardly beyond the offset 13. The angle beams 40 may also extend along and forwardly beyond the offset 13, and may be rigidly attached to the successive beams 35' on the opposite sides of the connector plates 38. At the reduced forward portion of the tank, the beam retainer plates 36' coact with and are attached to both the shell 10 and the lower plate 22 as indicated in Fig. 3; and the fifth wheel member 16 which is of relatively standard construction, is attached to the plate 22 adjacent the two foremost transverse internal reenforcing units which are stiffened by the struts 37' and the plates 38'.

Referring more particularly to Figs. 10 to 13 inclusive of the drawings, the improved vehicular tank assemblage therein illustrated, comprises in general front and rear longitudinally alined outer shells 41, 42 having elliptical transverse cross-section and being provided with a forward portion 43 of reduced height; a rear truck or carriage 44 having the usual springs and wheels 45 for normally supporting the rear end of the tank; a fifth wheel member 46 secured to the bottom of the reduced portion 43 and being detachably cooperable with another fifth wheel member 47 mounted upon the rear end of a propelling vehicle 18; and an auxiliary supporting carriage 48 for sustaining the tank in horizontal position when the vehicle 18 is removed from the assemblage.

In this modification the tank is relatively large and the shells 41, 42 are therefore composed of several sheets of metal interconnected so as to provide a smooth exterior. The interior of the modified tank is divided into three compartments by means of two transverse double dished partitions 49 each of which is reenforced and stiffened by a series of vertical channels 50 welded to the concave side of the partition 49 as shown in detail in Fig. 13. The partitions 49 are otherwise formed as previously described and are welded or otherwise rigidly attached to the adjacent shells. The top of the modified tank may also be reenforced by a cat-walk 51 and may be provided with the usual manholes for permitting access to the several compartments; and the bottom of the rear section or shell 42 may be provided with a box section reenforcing member 52 to which the rear wheels 45 and the auxiliary carriage 48 may be attached in an obvious manner. The front and rear ends of the modified tank assemblage are also provided with closure heads 53, 54 respectively, and the bottom of each tank compartment will obviously be provided with the usual liquid dispensing openings and pipes, not shown.

The interior of this modified tank assemblage besides being reenforced by the partitions 49 and by the channels 50, is additionally reenforced and strengthened so as to resist distortion and to effectively sustain beam loads, by means of transverse reenforcements each comprising a substantially continuous channel beam 55 shaped to snugly conform with the adjacent tank interior, and a series of vertical tubular struts 56 secured to each beam 55 as illustrated in Figs. 11 and 12. These reenforcements are preferably located at various localities throughout the length of the tank, and may be assembled outside of the shells 41, 42 and subsequently inserted therein and welded thereto. These transverse reenforcements may also be additionally stiffened by applying side plates 57 as in Fig. 12, and one of the stiffeners is preferably located closely adjacent to the offset at the rear end of the reduced tank portion 43. The beams 55 may be provided with suitable drainage passages at the bottom of the tank, and the sides of the modified tank assemblage may also be provided with reenforcements 32 as in the smaller tank previously described.

During manufacture of the present improved tank assemblages, the external plates may be cut to proper form and rolled to the proper shape, and subsequently edge welded. The partitions and reenforcing units may then be constructed and assembled outside of the tank so as to properly fit within the shells, and these parts may be subsequently inserted through the open shell ends. After being properly located within the shells, the partitions and internal reenforcing units and plates may be welded in place, whereupon the shell sections may be united in an obvious manner, and the end heads may be finally applied to the tank. The external reenforcing beam elements and side reenforcements 32 may be subsequently applied to substantially complete the tank assemblages, which may thereafter be handled as units and mounted upon the carriages and have the fifth wheel members, the auxiliary carriage, the bumper and the fenders attached thereto. The vehicular tank when thus constructed and finally assembled, produces a tank assemblage which will effectively sustain beam loads and other external and internal stresses, without utilizing a special undercarriage and without undesirably elevating the center of gravity.

From the foregoing detailed description, it will be apparent that the present invention provides an improved tank structure which is simple, compact and durable in construction and which is devoid of objectionable external projections which prevent streamlining and tend to resist transportation thereof at high speed. The improved frameless trailer structure is effectively reenforced both externally and internally, the longitudinal reenforcements being disposed externally of the shell and the internal braces extending transversely thereof. These reenforcements may be readily constructed and easily positioned and applied during assembly of the structure, and in no manner interfere with the normal use of the assembly. By properly spacing the transverse reenforcements and reenforced partitions, undesirable deflection and distortion of the outer shell in any direction may be positively prevented, and the local reenforcing members may also be relieved of excessive stresses thus providing a uniformly loaded elongated beam assembly. The upper reenforcing beam also serves to protect the manholes, and as a walk, and the lower stiffening beams may be used as hose carriers and for analogous purposes. The end heads and the offset may be rolled in simple machinery and the entire structure may therefore be produced at moderate cost. The assemblage also presents a neat streamline appearance, and obviously has large capacity considering the road space occupied.

It should be understood that it is not desired to limit the invention to the exact details of construction and to the precise mode of assembly herein shown and described, for various modifications within the scope of the claims may occur to persons skilled in the art.

I claim:

1. A vehicular tank comprising, an elongated shell having a downwardly and rearwardly inclined rear end head, an inverted U-shaped beam member rigidly attached to the top of said shell, a second U-shaped beam member rigidly attached to the bottom of said shell, and a U-shaped casing secured to the medial portion of said end head and connecting the rear ends of said members, said casing having a door for effecting access to the interior of said second beam member.

2. A vehicular tank comprising, an elongated shell having a rear end head, an inverted U-shaped beam member rigidly attached to the top of said shell, a second U-shaped beam member rigidly attached to the bottom of said shell, and a U-shaped casing spanning said head and connecting the rear ends of said members, said casing having a door for effecting access to the interior of said second beam member.

3. A vehicular tank comprising, a horizontal elongated shell of greater width than height having an end closure head, an inverted U-shaped beam member attached to and extending along the top of said shell, a second U-shaped beam member attached to and extending along the bottom of said shell, and a U-shaped casing spanning said head and connecting the corresponding ends of said members, said casing having a door for effecting access to the interior thereof.

4. A vehicular tank comprising, a horizontal elongated shell of greater width than height, a transverse centrally concave partition spanning the interior of said shell and having a continuous peripheral flange extending along the interior of said shell and away from the concave side of the partition, and a plurality of U-shaped reenforcing beams rigidly secured to said partition to form totally enclosed hollow tubular struts disposed entirely within and spanning the concavity of said partition and within said flange with their extreme ends attached to the flange and their outer surfaces approximately flush with the plane of the edge of said flange, said flange being attached to the interior of said shell.

5. A vehicular tank comprising, a horizontal elongated shell of greater width than height, a U-shaped reenforcing member secured to the interior of said shell to form an annular transverse tubular beam extending around the shell axis, a plurality of tubular struts having their ends rigidly attached to the upper and lower portions of said member and spanning the shell interior, said struts being disposed between the planes of the front and rear walls of said member, and connector plates rigidly attached to a wall of said reenforcing member and vertically spanning the opposite side portions thereof.

FREDERICK G. THWAITS.